(12) United States Patent
Sahoo et al.

(10) Patent No.: US 8,477,572 B1
(45) Date of Patent: *Jul. 2, 2013

(54) HEAT ASSISTED MAGNETIC RECORDING (HAMR) HEADS INCLUDING COMPONENTS MADE OF NICKEL ALLOYS

(75) Inventors: Sarbeswar Sahoo, Shakopee, MN (US);
Edwin Rejda, Bloomington, MN (US);
Ibro Tabakovic, Edina, MN (US);
Steven Carl Riemer, Minneapolis, MN (US); Michael Christopher Kautzky, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,129

(22) Filed: Aug. 28, 2012

Related U.S. Application Data

(63) Continuation of application No. 13/350,943, filed on Jan. 16, 2012, now Pat. No. 8,259,540.

(51) Int. Cl.
*G11B 11/00* (2006.01)
(52) U.S. Cl.
USPC ........................ 369/13.33; 360/235.1; 360/59
(58) Field of Classification Search
USPC .......... 369/13.33, 13.32, 13.24, 13.14, 13.03, 369/13.02, 13.17, 13.23, 13.54, 112.27, 13.13; 385/129, 146; 720/658; 360/59, 235.1
See application file for complete search history.

(56) References Cited

U.S. PATENT DOCUMENTS

| | | | |
|---|---|---|---|
| 6,795,630 B2 * | 9/2004 | Challener et al. | 385/129 |
| 7,643,248 B2 | 1/2010 | Sluzewski | |
| 7,791,839 B2 * | 9/2010 | Olson et al. | 360/125.31 |
| 8,081,542 B1 | 12/2011 | Grobis | |
| 8,208,221 B2 * | 6/2012 | Burbank et al. | 360/125.74 |
| 2008/0002298 A1 | 1/2008 | Sluzewski | |
| 2008/0068748 A1 * | 3/2008 | Olson et al. | 360/110 |
| 2011/0235480 A1 | 9/2011 | Goulakov | |
| 2011/0266469 A1 * | 11/2011 | Goulakov et al. | 250/505.1 |
| 2011/0267930 A1 * | 11/2011 | Hurley et al. | 369/13.32 |
| 2011/0317527 A1 * | 12/2011 | Wang et al. | 369/13.02 |
| 2012/0163139 A1 * | 6/2012 | Vavra et al. | 369/13.33 |

* cited by examiner

*Primary Examiner* — Ali Neyzari
(74) *Attorney, Agent, or Firm* — Mueting Raasch & Gebhardt PA

(57) ABSTRACT

A magnetic device that includes a write pole having a write pole tip; a read pole having a read pole tip; an optical near field transducer; and a contact pad. The contact pad includes $Ni_{100-a}X_a$, wherein X is chosen from Ru, Re, Zr, Cr, and Cu; and a is the atomic percent of the element X, and can range from about 20 to about 90. The optical near field transducer is positioned between the read pole and the write pole and the contact pad is positioned adjacent the write pole opposite the optical near field transducer.

20 Claims, 9 Drawing Sheets

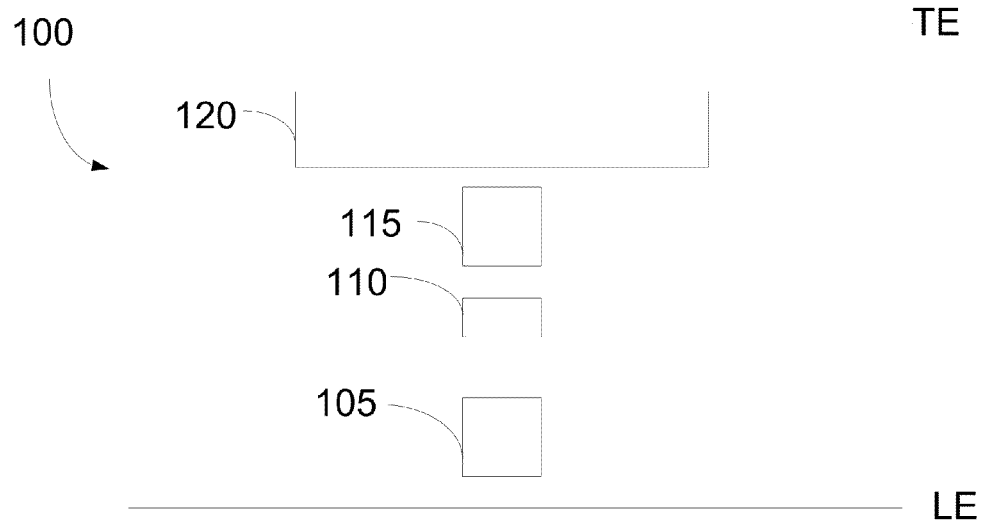
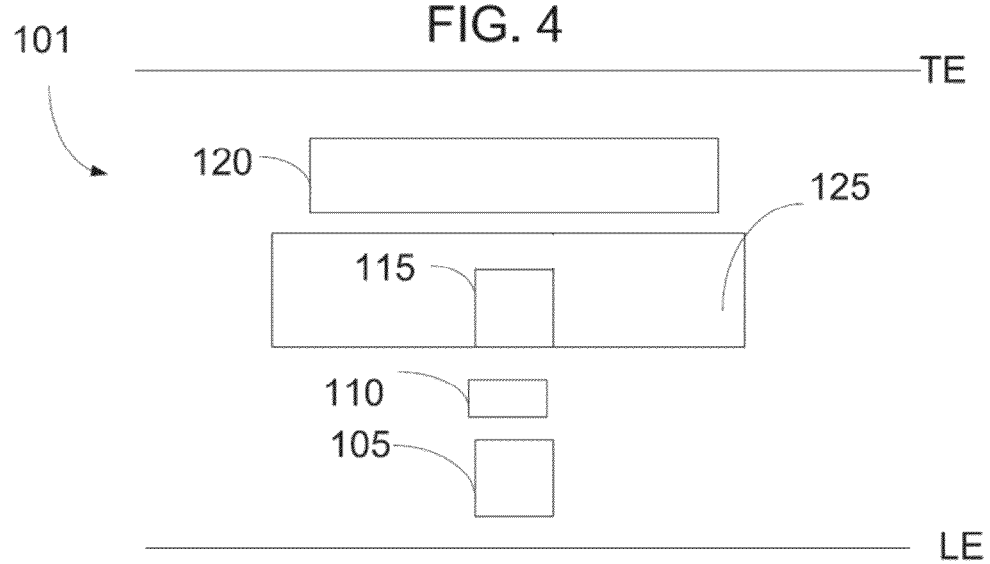

FIG. 5A
FIG. 5B
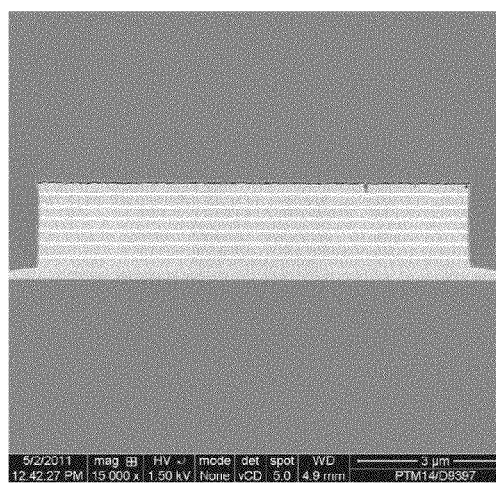
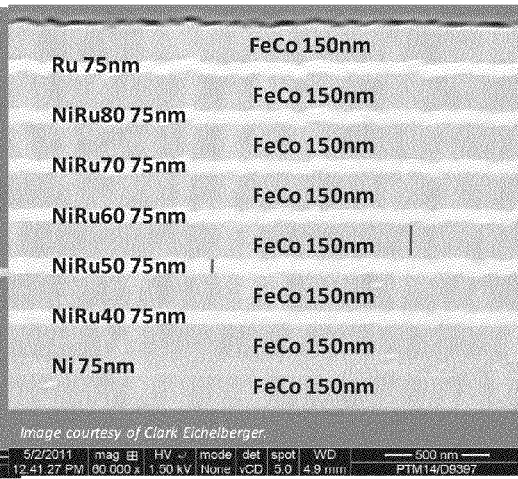
FIG. 6
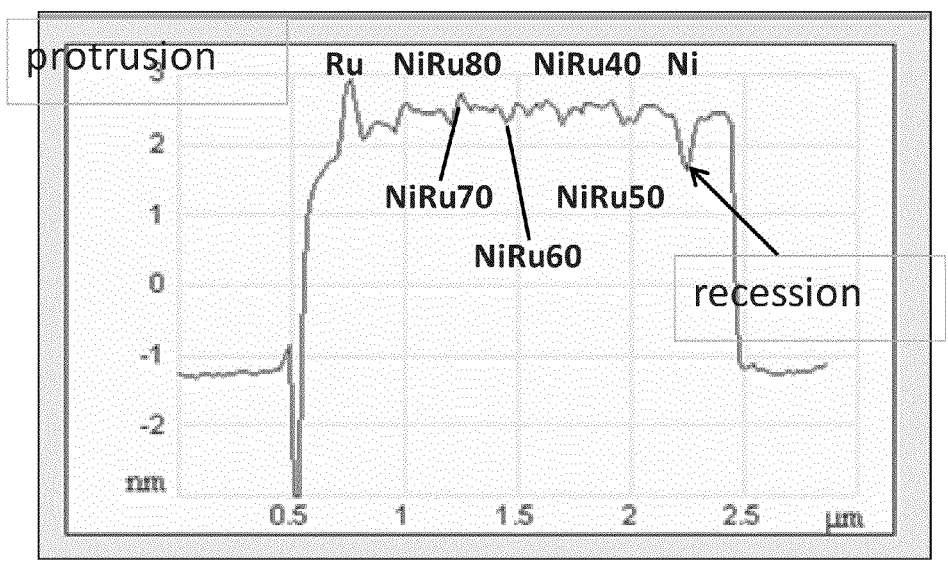

As-dep Stress vs Ru at%

HEAT ASSISTED MAGNETIC RECORDING (HAMR) HEADS INCLUDING COMPONENTS MADE OF NICKEL ALLOYS

CROSS-REFERENCE

This application is a continuation application of application Ser. No. 13/350,943 filed Jan. 16, 2012, and titled "Heat Assisted Magnetic Recording (HAMR) Heads Including Components Made of Nickel Alloys." The entire disclosure of which is incorporated herein by reference.

BACKGROUND

Heat assisted magnetic recording (referred to herein as "HAMR") technology is a promising approach for increasing storage density beyond 1 Tbit/inch$^2$. HAMR utilizes a laser to heat the recording medium to reduce its coercivity below the magnetic field applied from the writer. Advances in the construction and materials used in HAMR heads can further advance the use thereof for data storage.

SUMMARY

Disclosed is a magnetic device that includes a write pole; a read pole; an optical near field transducer; and a contact pad. The contact pad includes a nickel alloy. The optical near field transducer is positioned between the read pole and the write pole and the contact pad is positioned adjacent the write pole opposite the optical near field transducer.

Disclosed is a magnetic device that includes a write pole; a read pole; an optical near field transducer; and a contact pad. The contact pad includes $Ni_{100-a}X_a$, wherein X is chosen from Ru, Re, Zr, Cr, and Cu; and a is the atomic percent of the element X, and can range from about 20 to about 90. The optical near field transducer is positioned between the read pole and the write pole and the contact pad is positioned adjacent the write pole opposite the optical near field transducer.

Also disclosed is a slider that includes a slider body having a leading edge, a trailing edge and an air bearing surface; a write pole on the slider body and having a pole tip adjacent the air bearing surface; a read pole on the slider body and having a pole tip adjacent the air bearing surface; an optical near field transducer on the slider body adjacent the air bearing surface; and a contact pad on the slider body adjacent the air bearing surface. The contact pad includes $Ni_{100-a}X_a$, wherein X is chosen from Ru, Re, Zr, Cr, and Cu; and a is the atomic percent of the element X, and can range from about 20 to about 90. The optical near field transducer is positioned between the read pole and the write pole and the contact pad is positioned adjacent the write pole opposite the optical near field transducer.

Further disclosed is a disc drive that includes a suspension and a slider attached to the suspension. The slider includes a slider body having a leading edge, a trailing edge and an air bearing surface; a write pole on the slider body and having a pole tip adjacent the air bearing surface; a read pole on the slider body and having a pole tip adjacent the air bearing surface; an optical near field transducer on the slider body adjacent the air bearing surface; and a contact pad on the slider body adjacent the air bearing surface. The contact pad includes $Ni_{100-a}X_a$, wherein X is chosen from Ru, Re, Zr, Cr, and Cu; and a is the atomic percent of the element X, and can range from about 20 to about 90. The optical near field transducer is positioned between the read pole and the write pole and the contact pad is positioned adjacent the write pole opposite the optical near field transducer.

BRIEF DESCRIPTION OF THE DRAWINGS

FIG. 3 depicts an embodiment of a disclosed HAMR head from the air bearing surface (ABS).

FIG. 4 depicts an embodiment of a disclosed HAMR head that includes an optional heat sink from the ABS.

FIGS. 5A and 5B are scanning electron microscope (SEM) images of a multilayer structure at 15000× magnification (FIG. 5A) and 60000× magnification (FIG. 5B).

FIG. 6 shows atomic force microscopy (AFM) analysis of the multilayer stack (depicted in FIGS. 5A and 5B) after both slider level aqueous kiss-lap (AKL) and a 70° 50 Å etch diamond like carbon (DLC) process.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
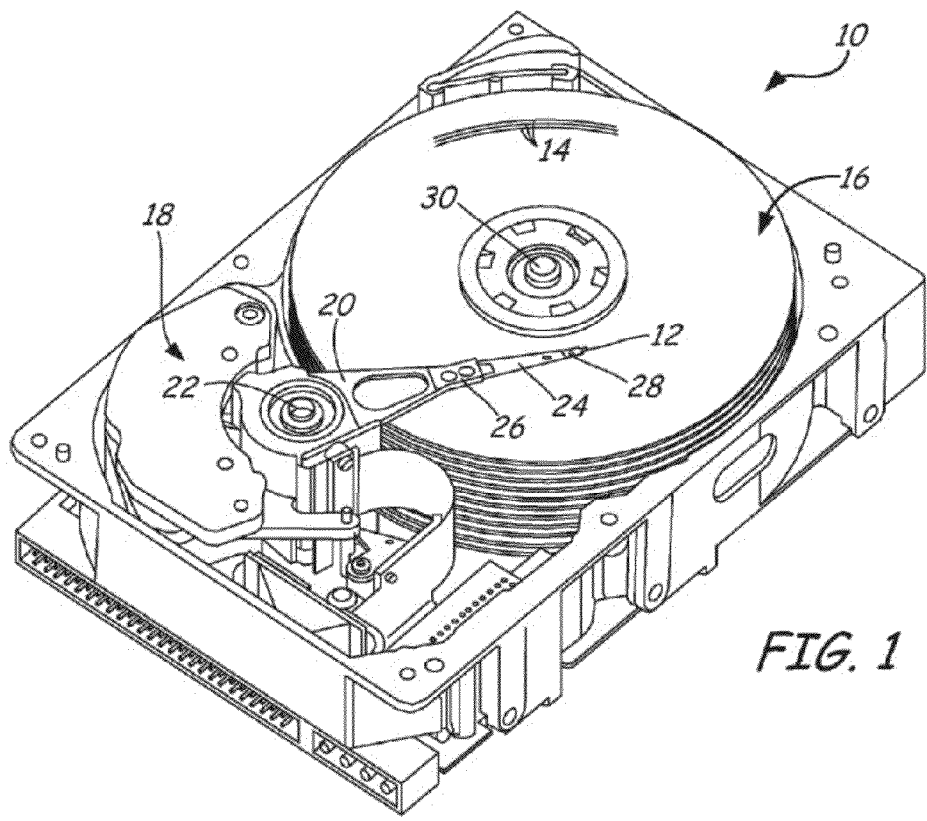
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
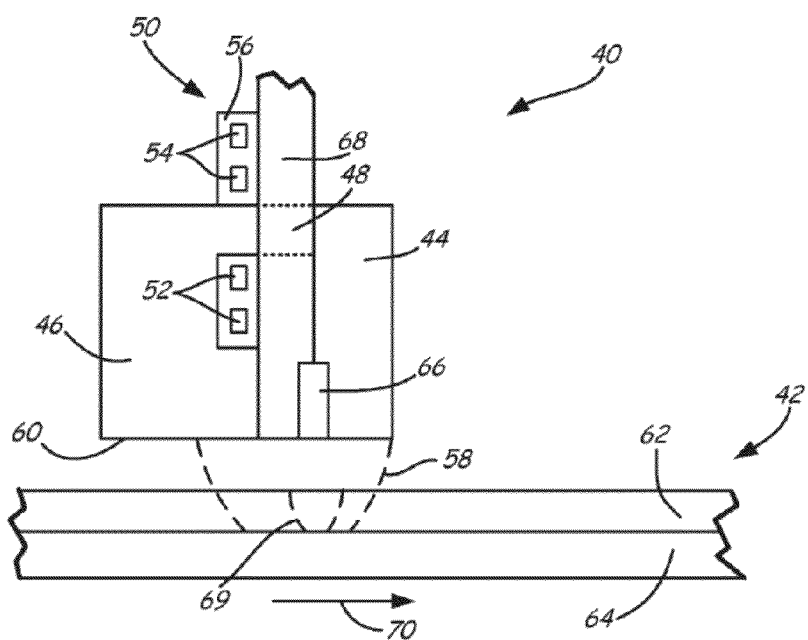
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an external source such as a laser. An electric field at the end of near field transducer 66 is used to heat a portion 69 of magnetically hard layer 62 to lower the coercivity so that the magnetic field from the write pole can affect the magnetization of the storage medium.

Portions of an exemplary magnetic device, for example a HAMR magnetic device are depicted in FIG. 3. FIG. 3 is a view from the storage medium (storage medium 42 in FIG. 2) looking up at the ABS. The magnetic device 100 depicted in FIG. 3 includes a read pole 105, a write pole 115, an optical near field transducer (also referred to as a NFT) 110 and a contact pad 120. The relative sizes and shapes of the components depicted in FIG. 3 is for illustration purposes only and should not be taken as limiting any of the components (including those depicted and those not depicted). As seen in FIG. 3, the optical near field transducer 110 is positioned between the write pole 115 and the read pole 105. The contact pad 120 is positioned adjacent the write pole 115 opposite the optical near field transducer 110. The contact pad 120 is closest to the trailing edge (designated as TE in FIG. 3), with the read pole 105 being closest to the leading edge (designated as LE in FIG. 3).

In embodiments, the contact pad has a width (in the direction from the trailing edge to the leading edge) from 1 micrometer (μm) to 4 μm, in embodiments from 1.25 μm to 1.75 μm, and in embodiments about 1.5 μm.

Disclosed magnetic devices can also include heat sinks that are formed of a nickel alloy. FIG. 4 illustrates an exemplary embodiment of a magnetic device 101. The exemplary magnetic device 101 includes the components discussed above (numbered similarly) and also includes an optional heat sink 125. The heat sink 125 can be positioned around at least a portion of the write pole 115. Generally, the heat sink 125 functions to dissipate heat from the write pole 115. In embodiments at least two sides of a write pole are surrounded by a heat sink. In embodiments, such as that depicted in FIG. 4, at least three sides of a write pole 115 are surrounded by a heat sink 125. In embodiments, all four sides of a write pole can be surrounded by a heat sink.

In disclosed magnetic devices, the contact pad 120, the heat sink 125, or both can be formed from an alloy that includes nickel (Ni). In embodiments, the nickel alloy can be described as NiX. The alloy can also be described as $Ni_{100-a}X_a$ with a being the atomic percent of the element X. X can be chosen from ruthenium (Ru), rhenium (Re), zirconium (Zr), chromium (Cr), Copper (Cu) and combinations thereof. In embodiments, X is Ru, Cr, or combinations thereof. In embodiments, X is Ru or Cr. In embodiments, X is Ru. In embodiments, the element X can be an element that if the contact pad were made entirely of it, the contact pad would tend to protrude towards the ABS farther then if the contact pad were made entirely of nickel.

In embodiments, a can range from 20 atomic percent (at %) to 90 at %; from 40 at % to 80 at %; or from 60 at % to 80 at %. In embodiments, a can range from 20 at % to 70 at %, or from 30 at % to 60 at %; or from 40 at % to 50 at %. In embodiments where X is Ru, a can range from 20 at % to 90 at %; from 40 at % to 80 at %; or from 60 at % to 80 at %. In embodiments were X is Cr, a can range from 20 at % to 70 at %; from 30 at % to 60 at %; or from 40 at % to 50 at %.

Nickel alloys as utilized herein may also optionally include a third component. The optional third component can be one that is chosen to affect various properties of the alloys. For example, the optional third component can be chosen to increase the hardness of the alloy, increase the grain stability, increase the wear resistance, decrease the stress, increase the resistance to corrosion, or some combination thereof. In embodiments, the optional third alloy can be chosen from: ruthenium (Ru), rhenium (Re), copper (Cu), chromium (Cr), zirconium (Zr), tungsten (W), and iron (Fe) for example. In embodiments a nickel alloy with an optional third alloy can be described by the formula $Ni_{(100-a-b)}X_aY_b$, where X is chosen from ruthenium (Ru), rhenium (Re), zirconium (Zr), chromium (Cr), and Copper (Cu); Y is chosen from ruthenium (Ru), rhenium (Re), copper (Cu), chromium (Cr), zirconium (Zr), tungsten (W), and iron (Fe); a can range from 20 at % to 90 at %; and b can range from 1 at % to 50 at %.

Disclosed magnetic devices that include a contact pad, heat sink, or both formed from $Ni_{100-a}X_a$ alloys can have desirable levels of protrusion at elevated temperatures (such as those encountered in HAMR). In embodiments, contact pads, heat sinks, or both formed from $Ni_{100-a}X_a$ alloys can have a level of protrusion that is similar to the protrusion of the write pole. In embodiments, contact pads, heat sinks, or both formed from $Ni_{100-a}X_a$ alloys can have a level of protrusion that is slightly more protruded than the write pole. In embodiments, contact pads, heat sinks, or both formed from $Ni_{100-a}X_a$ alloys can have a level of protrusion that is not more than 10% more than the protrusion of the write pole.

Alloys used herein for the contact pad, heat sink, or both may also have other properties. In embodiments, alloys used herein for the contact pad, heat sink, or both may be non-magnetic. Experimental results and results from models show that NiRu alloys (for example) become non-magnetic above 15 at % ruthenium (Ru). In embodiments, the alloys utilized for the contact pad, heat sink, or both can be relatively resistant to corrosion. In embodiments the alloys utilized for the contact pad, heat sink, or both can have a positive corrosion potential ($E_{corr}$) relative to the write pole material. In embodiments, alloys used herein for the contact pad, heat sink, or both may have low stress, high wear resistance, acceptable adhesion with other materials in the magnetic device, are capable of being planarized (for example by using chemical mechanical polishing (CMP)), have low roughness, have no more than a minimal mismatch of the coefficient of thermal expansion (CTE) with that of the write pole material (for example CoFe), have a relatively high thermal conductivity, have a thermally stable microstructure, can be deposited without voids (i.e., conformal deposition), or some combination thereof these properties (and/or others not described herein).

Nickel alloys utilized herein can be deposited via sputtering methods, electrodeposition methods, or other methods.

Magnetic devices disclosed herein can also include other structures. Magnetic devices disclosed herein can also be incorporated into larger devices. For example, sliders can include magnetic devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example.

EXAMPLES

While the present disclosure is not so limited, an appreciation of various aspects of the disclosure will be gained through a discussion of the examples provided below.

Recession/Protrusion of NiRu Alloys

In order to evaluate the recession and protrusion profile of various $NiRu_x$ alloys relative to an exemplary FeCo write pole, a multilayer stack of varying composition of NiRu (beginning with 100 at % Ni and ending with 100 at % Ru) intercalated between FeCo was deposited. Scanning electron microscope (SEM) images of the multilayer stack can be seen in FIGS. 5A and 5B. FIG. 5A shows a 15000× magnification and FIG. 5B shows a 60000× magnification.

FIG. 6 shows the atomic force microscopy (AFM) analysis of the multilayer stack after both slider level aqueous kiss-lap (AKL) and a 70° 50 Å etch diamond like carbon (DLC) process. From looking at the graph in FIG. 6 it can be seen that pure Ni recesses and pure Ru protrudes with respect to FeCo, while NiRu layers in the composition range of $Ni_{40}Ru_{60}$ to $Ni_{20}Ru_{80}$ is substantially co-planar or has minimal recession/protrusion relative to FeCo.

Thermal Stability of NiRu Alloys

Figure 7A:
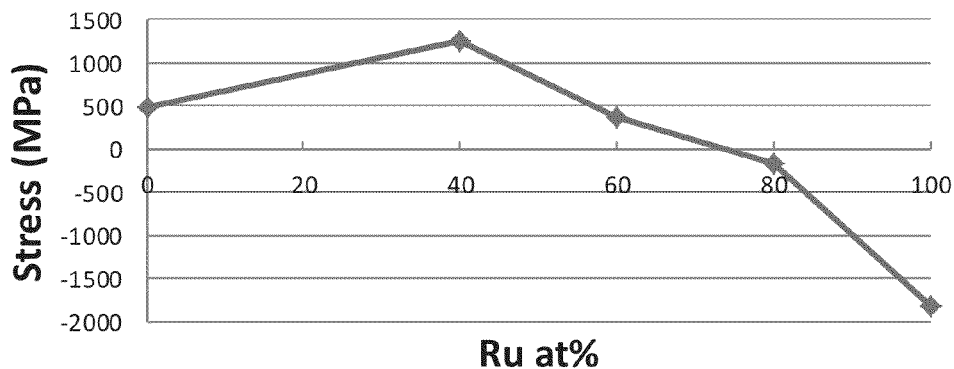
FIGS. 7A, 7B, and 7C show the as deposited stress (MPa) as a function of the atomic % of ruthenium (FIG. 7A), and the stress changes in $Ni_{40}Ru_{60}$ (FIG. 7B) and $Ni_{20}Ru_{80}$ (FIG. 7C).
Figure 7B:
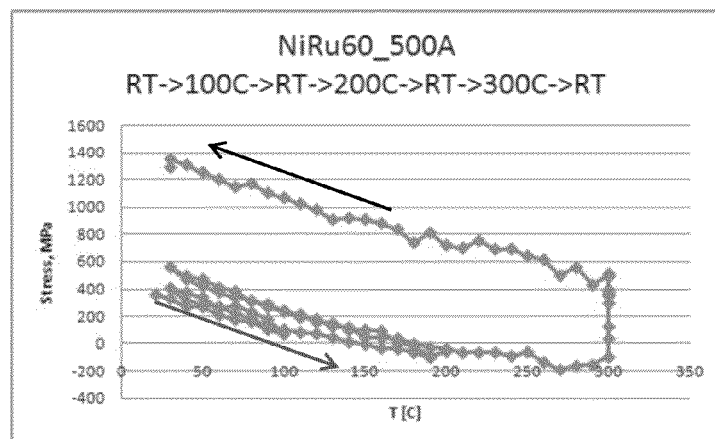
Figure 7C:
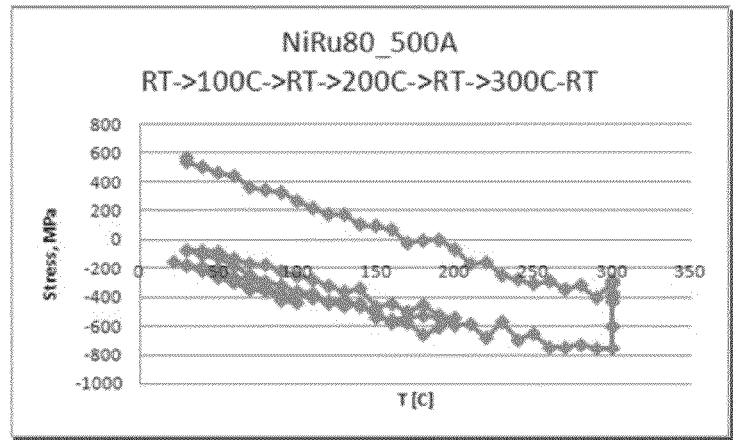

Thermal stability of NiRu alloys was tested by measuring the evolution of stress versus temperature. FIG. 7A and Table 1 below shows the as deposited stress (MPa) as a function of the atomic % of ruthenium. FIGS. 7B and 7C shows the stress changes in $Ni_{40}Ru_{60}$ (FIG. 7B) and $Ni_{20}Ru_{80}$ (FIG. 7C). As can be seen from FIGS. 7B and 7C, both $Ni_{40}Ru_{60}$ and $Ni_{20}Ru_{80}$ undergo small stress changes (230 and 81 MPa respectively) up to 200° C., which demonstrates good thermal stability of the alloys.

TABLE 1

| Alloy | Thickness (Å) | Mean Stress (MPa) |
|---|---|---|
| Ni | 500 | +487.9 |
| $Ni_{60}Ru_{40}$ | 500 | +1243.3 |
| $Ni_{40}Ru_{60}$ | 500 | +358.6 |
| $Ni_{20}Ru_{80}$ | 500 | −158.3 |
| Ru | 500 | −1830.3 |

Figure 8A:
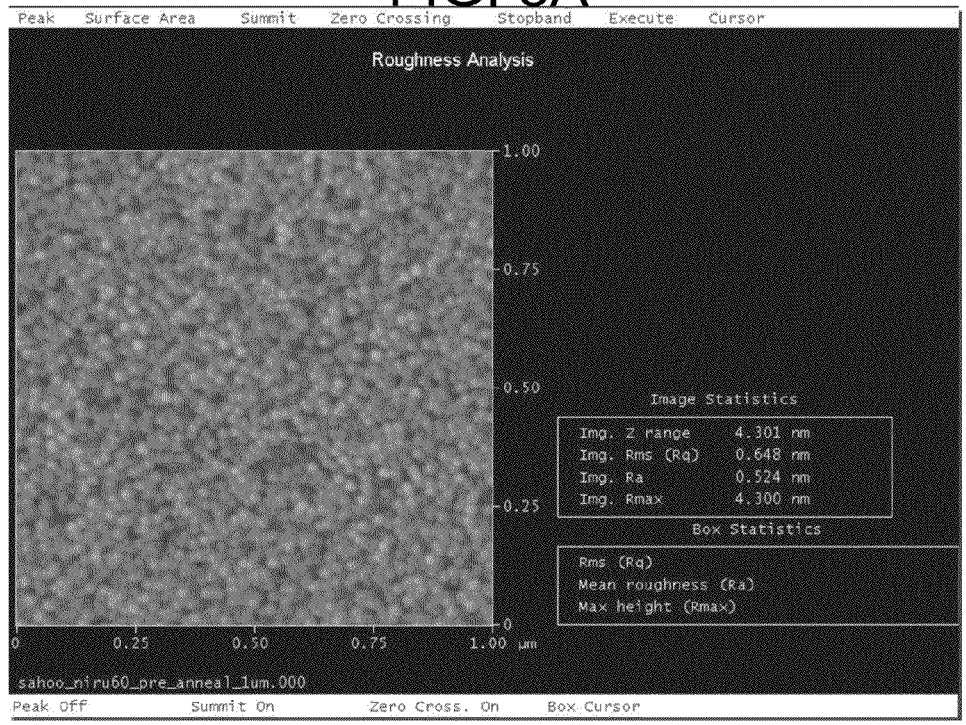
FIGS. 8A and 8B show AFM scans of as-deposited (FIG. 8A) versus post-anneal at 300° C. for two hours (FIG. 8B).
Figure 8B:
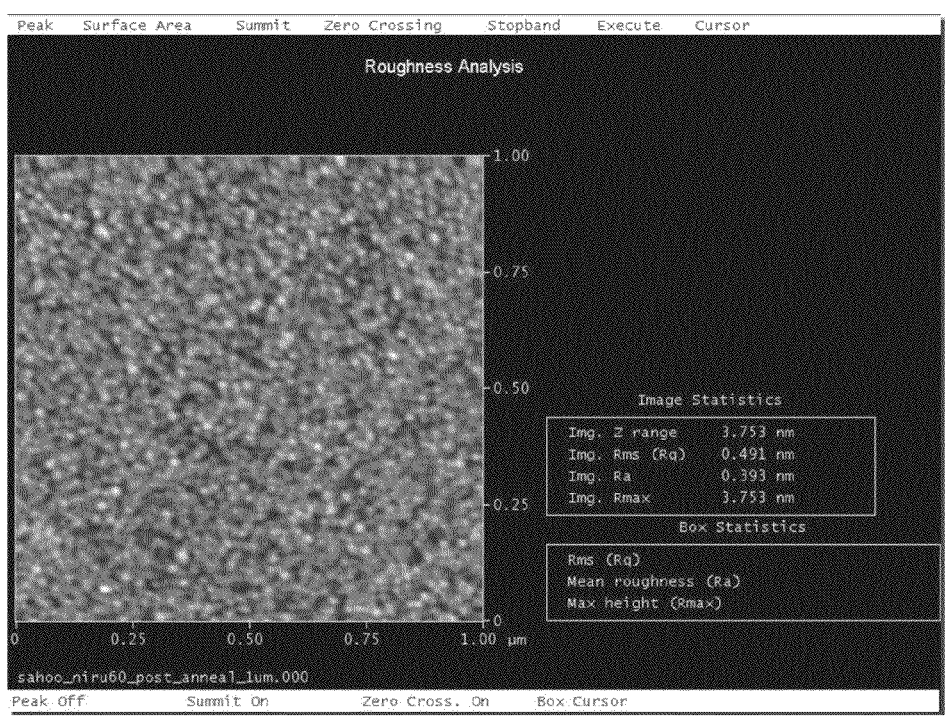

FIGS. 8A and 8B show AFM scans of as-deposited (FIG. 8A) versus post-anneal at 300° C. for two hours (FIG. 8B). The post-anneal AFM images don't show grain growth or roughness increases corroborating the good thermal stability of the material up to 300° C.

Structural Stability of NiRu Alloys

Figure 9A:
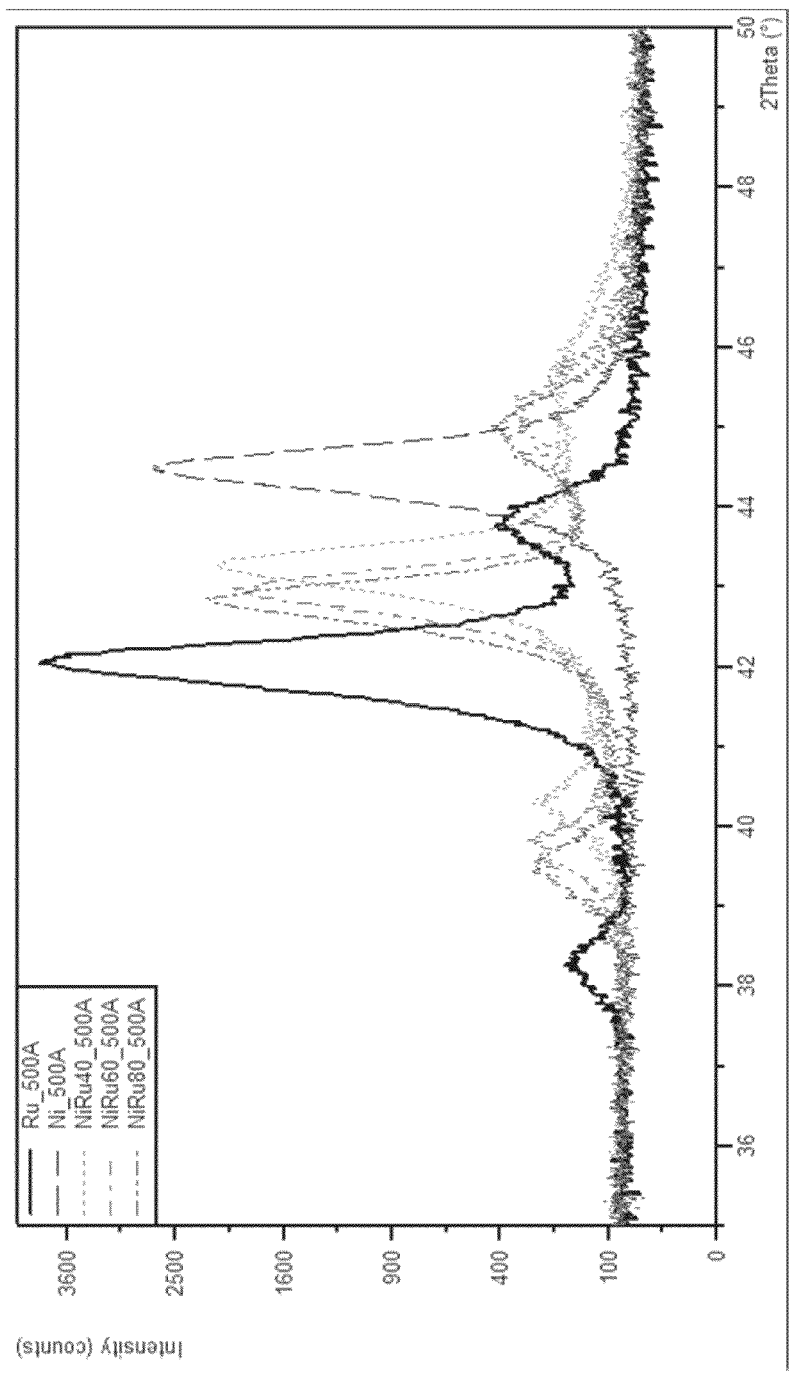
FIGS. 9A and 9B show the X-Ray Diffraction (XRD) analysis of the as-deposited pure Ni, pure Ru and alloys; and the as deposited versus post-anneal analysis (FIG. 9B).
Figure 9B:
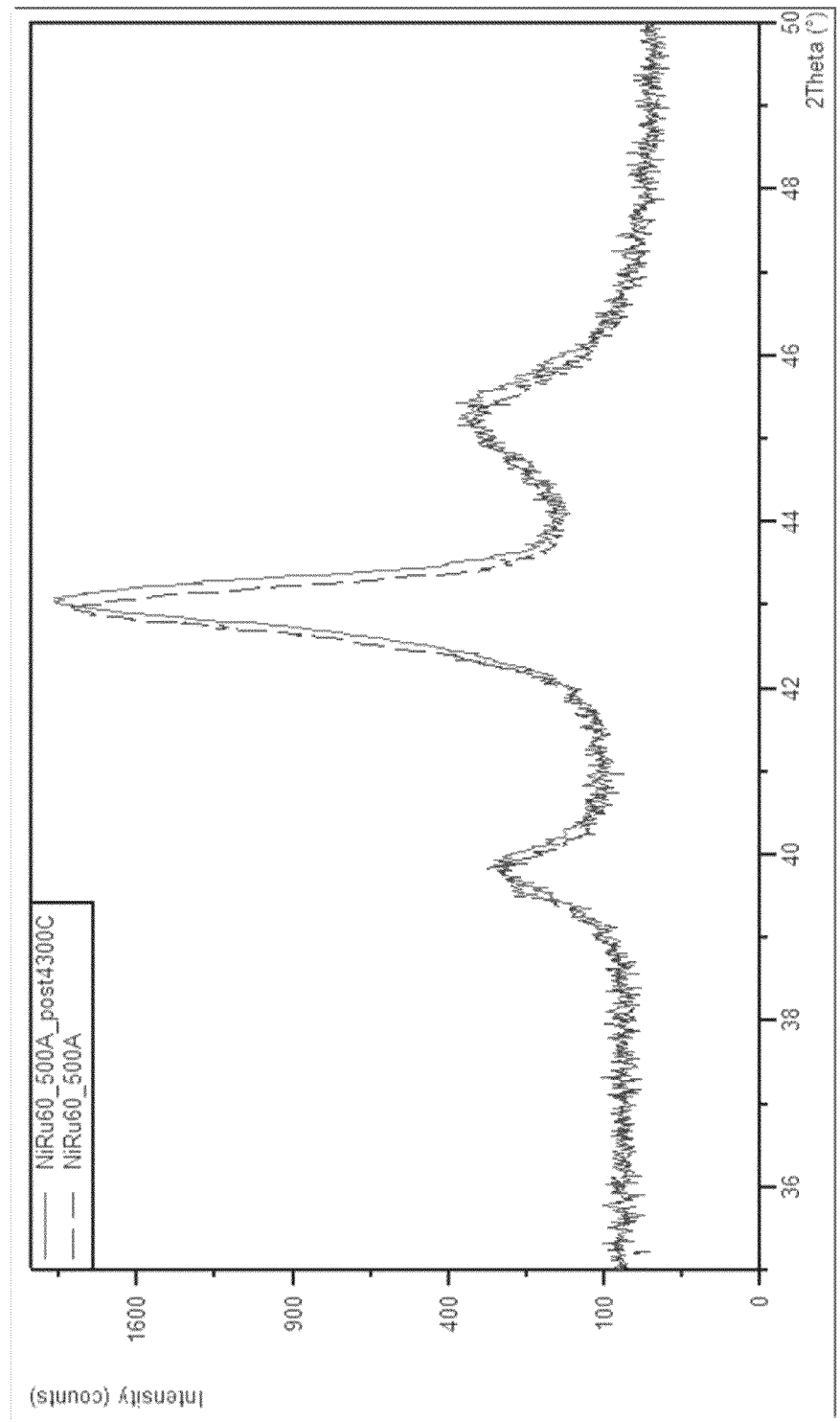

The structural stability of the materials was measured by X-ray diffraction (XRD) in the as-deposited and post-anneal states. FIG. 9A shows that the as-deposited pure Ni exhibits a single textured fcc (111) crystal state while pure Ru and NiRu alloys show multi-textured hcp phase only. FIG. 9B shows that the NiRu alloys shows a 2θ shift of 0.1°, which corresponds to a residual strain of negligible amount of 0.2%. No peak broadening of the post-anneal film demonstrates good structural stability. It should be noted that the single textured fcc (111) NiRu alloys are metastable and remain so even after a 300° C. anneal.

Chemical Stability of NiRu Alloys

The corrosion potentials ($E_{corr}$) of nickel alloys were tested to assess the chemical robustness of the materials. The corrosion potentials were tested at 0.1 M NaCl pH 5.9 (neutral media) and at pH 3 (acidic media). The results are shown in Tables 2 and 3 below.

TABLE 2

| Neutral (0.1 M NaCl; pH 5.9) | $E_{corr}$ (V vs. SCE) | $I_{corr}$ (μA/cm$^2$) |
|---|---|---|
| Ni | −0.14 | 0.012 |
| $Ni_{60}Ru_{40}$ | 0.0743 | 0.15 |
| $Ni_{40}Ru_{60}$ | 0.094 | 0.16 |
| $Ni_{20}Ru_{80}$ | 0.19 | 0.049 |
| Ru | 0.24 | 0.05 |

TABLE 3

| Acidic (0.1 M NaCl; pH 3) | $E_{corr}$ (V vs. SCE) | $I_{corr}$ (μA/cm$^2$) |
|---|---|---|
| Ni | 0.008 | 0.05 |
| $Ni_{60}Ru_{40}$ | 0.32 | 1.3 |
| $Ni_{40}Ru_{60}$ | 0.37 | 0.67 |
| $Ni_{20}Ru_{80}$ | 0.37 | 0.45 |
| Ru | 0.36 | 0.05 |

Figure 10A:
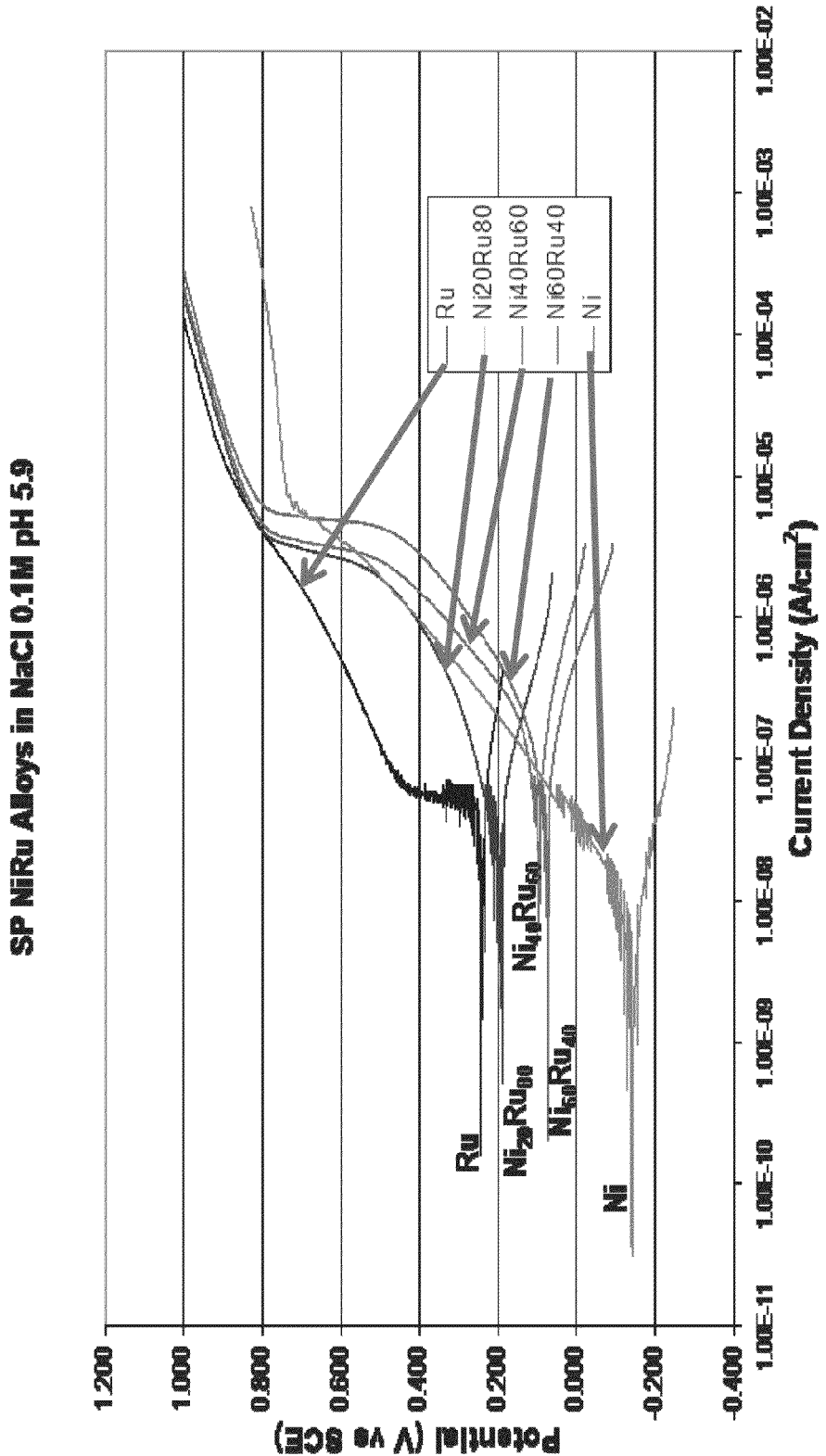
FIGS. 10A and 10B show the potential versus current density scans of pure nickel, pure ruthenium, and various NiRu alloys at 0.1 M NaCl pH 5.9 (FIG. 10A) and pH 3 (FIG. 10B).
Figure 10B:
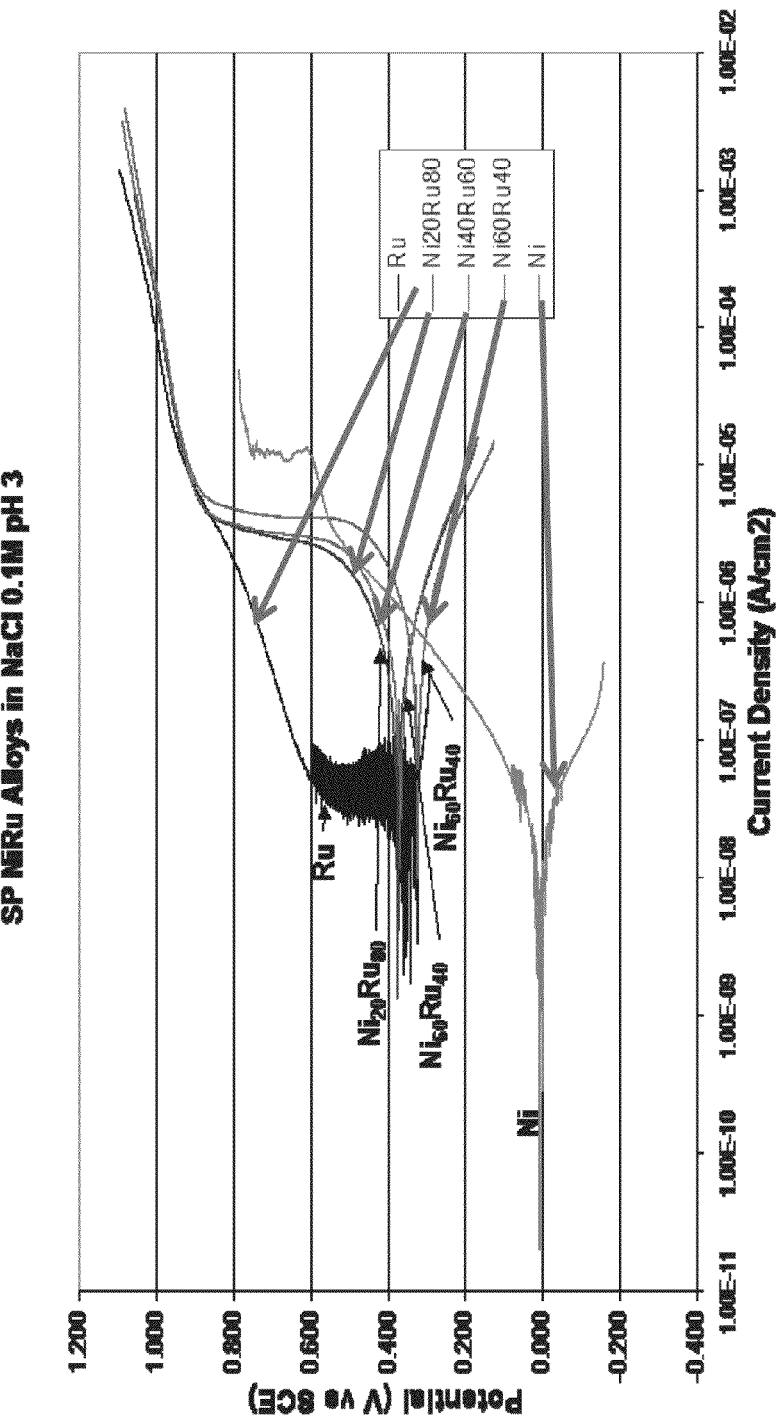

As seen from Tables 2 and 3, the nickel alloys exhibited high resistance to corrosion (as indicated by the positive Ecorr) and good passivity in both neutral (Table 2) and acidic (Table 3) environments. All of the nickel alloys tested had better corrosion resistance than FeCo ($E_{corr}$ vs. SCE=−0.30), $Ni_{45}Fe_{55}$ ($E_{corr}$ vs. SCE=−0.25), and Cr ($E_{corr}$ vs. SCE=0.03). FIGS. 10A and 10B show the potential versus current density scans of pure nickel, pure ruthenium, and various NiRu alloys at 0.1 M NaCl pH 5.9 (FIG. 10A) and pH 3 (FIG. 10B) respectively.

Thus, embodiments of HEAT ASSISTED MAGNETIC RECORDING (HAMR) HEADS INCLUDING COMPONENTS MADE OF NICKEL ALLOYS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A magnetic device comprising:
   a write pole;
   a read pole;
   an optical near field transducer; and
   a contact pad, the contact pad comprising an alloy that comprises nickel,
   wherein the optical near field transducer is positioned between the read pole and the write pole and the contact pad is positioned adjacent the write pole opposite the optical near field transducer.

2. The magnetic device according to claim 1, wherein the magnetic device has an air bearing surface, a leading edge and trailing edge, and wherein the contact pad is the closest to the trailing edge.

3. The magnetic device according to claim 2, wherein the contact pad has a width in the direction from the trailing edge to the leading edge from about 1 micrometer to about 4 micrometers.

4. The magnetic device according to claim 1 further comprising a heat sink positioned adjacent the write pole.

5. The magnetic device according to claim 1, wherein the alloy comprises $Ni_{100-a}X_a$, wherein X is chosen from: Ru, Re, Zr, Cr, and Cu; and a is the atomic percent of the element X, and can range from about 20 to about 90.

6. The magnetic device according to claim 5, wherein X is Ru.

7. The magnetic device according to claim 6, wherein a is from about 40 to about 80.

8. The magnetic device according to claim 5, wherein X is Cr.

9. The magnetic device according to claim 8, wherein a is from about 30 to about 60.

10. A magnetic device comprising:
    a write pole;
    a read pole;
    an optical near field transducer;
    a contact pad, the contact pad comprising an alloy that comprises nickel; and
    a heat sink positioned adjacent the write pole, the heat sink comprising the alloy that comprises nickel,
    wherein the magnetic device has an air bearing surface, a leading edge and trailing edge, and wherein the contact pad is the closest to the trailing edge, the optical near field transducer is positioned between the read pole and the write pole and the contact pad is positioned adjacent the write pole opposite the optical near field transducer.

11. The magnetic device according to claim 10, wherein the alloy comprises $Ni_{100-a}X_a$, wherein X is chosen from: Ru, Re, Zr, Cr, and Cu; and a is the atomic percent of the element X, and can range from about 20 to about 90.

12. The magnetic device according to claim 11, wherein X is Ru.

13. The magnetic device according to claim 12, wherein a is from about 40 to about 80.

14. The magnetic device according to claim 11, wherein X is Cr.

15. The magnetic device according to claim 14, wherein a is from about 30 to about 60.

16. A disc drive comprising:
    a suspension; and
    a slider attached to the suspension, the slider comprising:
       a slider body having a leading edge, a trailing edge and an air bearing surface;
       a write pole on the slider body and having a pole tip adjacent the air bearing surface;
       a read pole on the slider body and having a pole tip adjacent the air bearing surface;
       an optical near field transducer on the slider body adjacent the air bearing surface; and
       a contact pad on the slider body adjacent the air bearing surface, wherein the contact pad comprises an alloy, the alloy comprising nickel,
       wherein the optical near field transducer is positioned between the read pole and the write pole and the contact pad is positioned adjacent the write pole on the opposite side of the optical near field transducer.

17. The disc drive according to claim 16, wherein the alloy comprises $Ni_{100-a}X_a$, wherein X is chosen from: Ru, Re, Zr, Cr, and Cu; and a is the atomic percent of the element X, and can range from about 20 to about 90.

18. The disc drive according to claim 17, wherein X is Ru and a is from about 40 to about 80.

19. The disc drive according to claim 17, wherein X is Cr and a is from about 30 to about 60.

20. The disc drive according to claim 16 further comprising a heat sink comprising a nickel alloy, wherein the nickel alloy comprises $Ni_{100-a}X_a$, wherein X is chosen from: Ru, Re, Zr, Cr, and Cu; and a is the atomic percent of the element X, and can range from about 20 to about 90.

* * * * *